United States Patent
Powers et al.

(10) Patent No.: US 7,310,339 B1
(45) Date of Patent: Dec. 18, 2007

(54) PACKET MESSAGING METHOD AND APPARATUS

(75) Inventors: Simon Julian Powers, Ipswich (GB); Michael R Hinds, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/914,601

(22) PCT Filed: Mar. 24, 2000

(86) PCT No.: PCT/GB00/01135
§ 371 (c)(1),
(2), (4) Date: Aug. 30, 2001

(87) PCT Pub. No.: WO00/62506
PCT Pub. Date: Oct. 19, 2000

(30) Foreign Application Priority Data
Mar. 31, 1999 (GB) ................ 9907445.2

(51) Int. Cl.
*H04L 12/28* (2006.01)
(52) U.S. Cl. .................. 370/394; 370/412
(58) Field of Classification Search ........... 370/352, 370/389, 392, 394, 461, 462, 412
See application file for complete search history.

(56) References Cited

U.S. PATENT DOCUMENTS

| | | | |
|---|---|---|---|
| 5,289,468 A * | 2/1994 | Yoshida | 370/401 |
| 5,495,478 A * | 2/1996 | Wilkinson et al. | 370/399 |
| 5,875,309 A * | 2/1999 | Itkowsky et al. | 710/113 |
| 6,047,326 A * | 4/2000 | Kilkki | 709/228 |
| 6,320,845 B1 * | 11/2001 | Davie | 370/230 |
| 6,337,861 B1 * | 1/2002 | Rosen | 370/389 |
| 6,388,994 B1 * | 5/2002 | Murase | 370/235 |
| 6,580,719 B1 * | 6/2003 | Soboleva et al. | 370/412 |
| 6,597,682 B1 * | 7/2003 | Kari | 370/348 |

* cited by examiner

*Primary Examiner*—Huy D. Vu
*Assistant Examiner*—Christine Ng
(74) *Attorney, Agent, or Firm*—Nixon & Vanderhye P.C.

(57) ABSTRACT

Each packet message in a sequence of packet messages is sent with an associated packet message priority label in accordance with a predetermined cyclic sequence of such labels. These priority labels each represent one of a plurality of priority levels and the position of each label in the cyclic sequence is such that number of consecutive lower priority labels between that label and the nearest label of equal or higher priority is substantially maximized. In this way, if packet messages are dropped from the sequence due to congestion on a priority basis, the packet messaging method and apparatus according to the invention ensure that, as far as possible, regular update packet messages are still received from all packet message sources.

12 Claims, 9 Drawing Sheets

Fig.1.
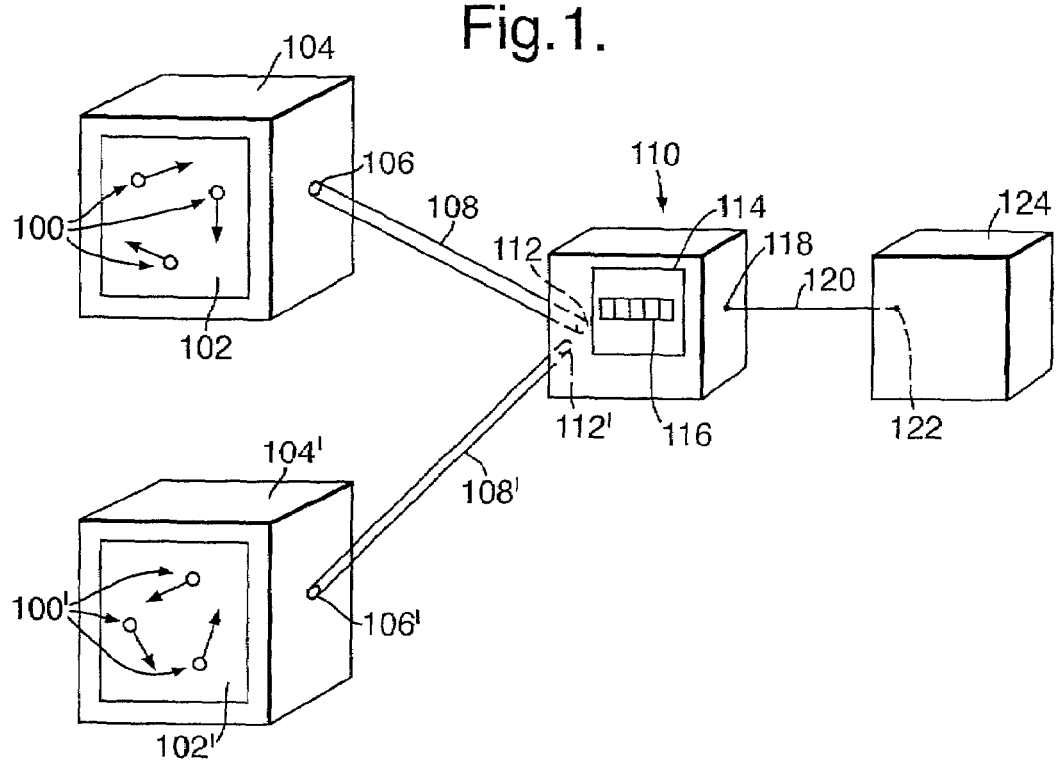
Fig.2.
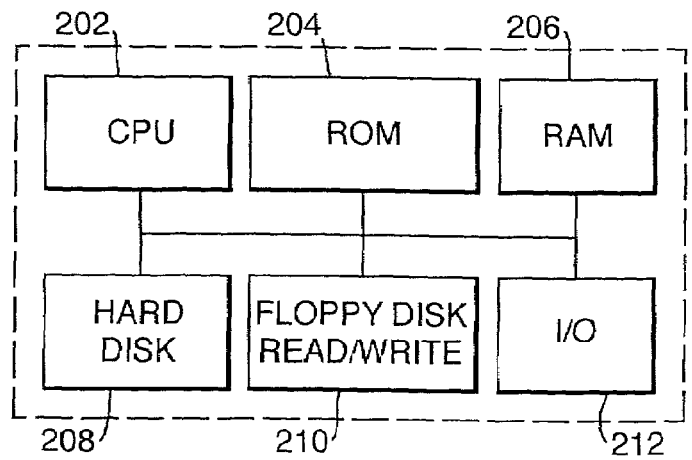
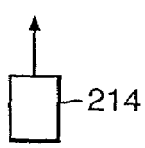

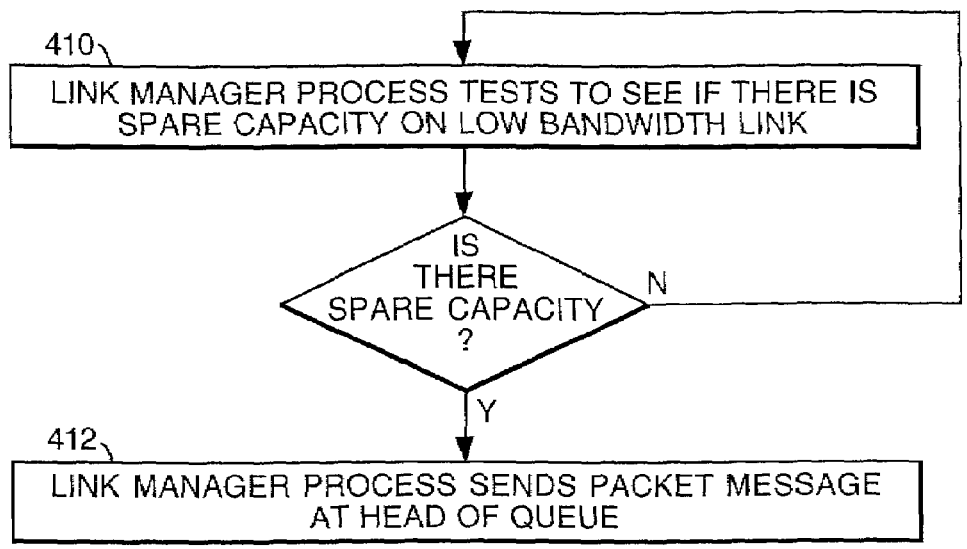
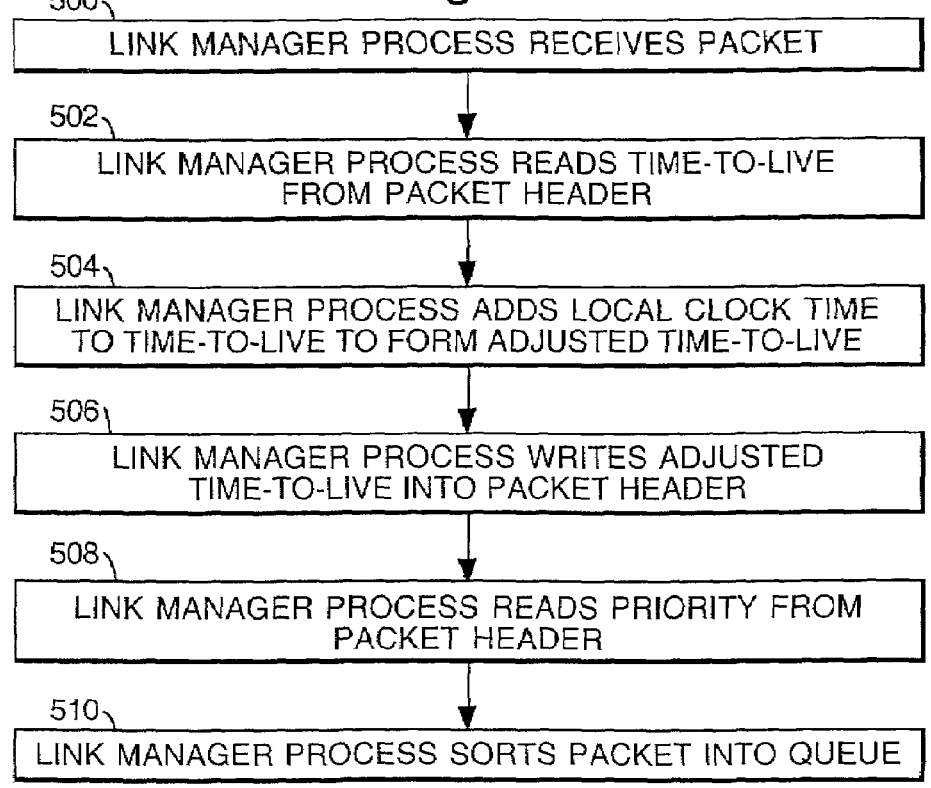

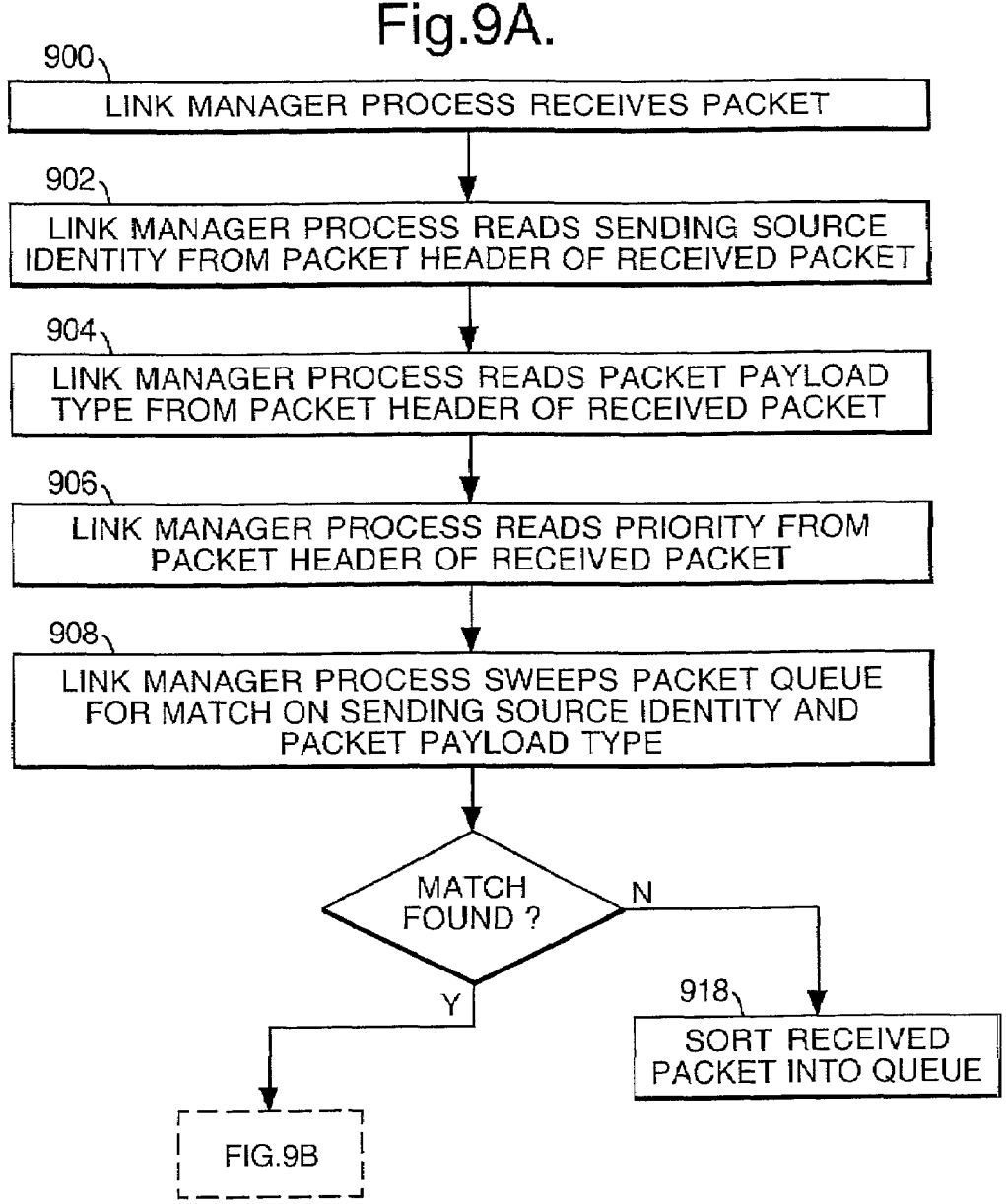

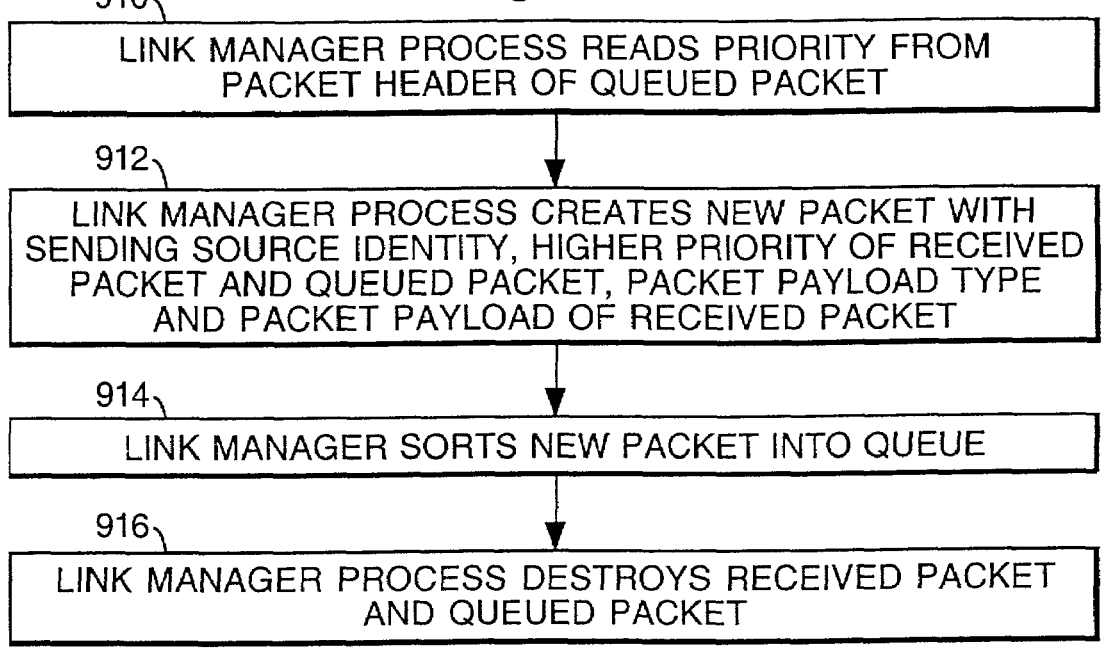

PACKET MESSAGING METHOD AND APPARATUS

BACKGROUND OF THE INVENTION

1. Technical Field

The present invention relates to a method of and apparatus for the management of packet messaging. The invention has application, in particular, in the optimal management of a certain class of packet messaging over a low bandwidth link.

2. Related Art

A wide variety of situations are known where a source entity transmits messages over a communications link to a receiving entity. A well known subset of this variety of situations involves the communications link over which the source entity transmits its messages having an insufficient bandwidth to be able to carry the volume of messages intended for the receiving entity.

One crude solution to this problem would simply be to send as many messages as can be sent at any given time and then to discard any remaining 'overflow' messages. Whilst having the merit of simplicity, this solution cannot provide an efficient utilisation of the communication link. A sudden burst of activity may lead to a flood of messages with the overflow messages being discarded. Following the burst of activity however, the communications link may return to being only lightly loaded.

An improved solution would provide for the buffering of the overflow messages. The overflow messages would not then simply be discarded if they could not be sent at any given time, but could be buffered and sent following the burst of activity, when the communications link had returned to being only lightly loaded. It will be clear that there will be limits to the size of the message buffer, however, such that it might be imagined that the buffer itself might overflow. It will also be clear that there is no substantive discrimination between the messages, all messages being treated as being of equal importance.

A different approach altogether may be applied in certain circumstances where the messages may be considered as being of different importance. As and when congestion on the communications link between the source entity and the receiving entity occurs, more important messages may be transmitted over the communications link whereas less important messages may be discarded, or buffered as discussed above.

A well known example of such an approach with a single source entity is the concept of 'layered video coding'. Such an approach could just as well be applied to a number of competing source entities however, where the source entities and hence their respective messages are ranked according to their importance.

A problem having somewhat different characteristics from the preceding situation is, rather, one where there are a number of competing yet equally important source entities all transmitting the same type of message. An example might be a number of source entities that transmit messages as to some aspect of their state. Mobile entities might, for example, transmit messages as to their location. Likewise, sensor entities might transmit messages as to ambient temperature or pressure.

A more familiar example might be that of a networked computer game such as 'Quake' (created by ID Software of Mesquite, Tex., USA), where mobile creatures are created in a three-dimensional virtual environment running on one or more server computers. The positions of these creature source entities may be messaged to game entities hosted on client computers connected to the server or servers as appropriate.

Typically, what will be most important for the entity receiving such periodic state update messages, is to ensure that regular updates are received from all the source entities. If a number of source entities are sending messages with state updates, it will typically be more important to receive regular state updates from all the source entities than to receive all the state updates from a subset of the source entities and few, if any, state updates from the remaining source entities. This is to say that it is typically more important to keep down the maximum possible state error of source entities rather than the average state error of all the source entities.

To use the example of a game such as Quake again, if a game player's character is surrounded by highly mobile hostile creatures, it may well be more important for the game player's character to know where all the relevant creatures are (or rather where they all were a short time ago) to within a relatively small error rather than knowing where a subset of the creatures are to within a very small error (where they are now) with the remainder of the (highly mobile hostile) creature's positions only being known with a relatively large error (where they were a while ago).

It will be clear that a simple hierarchically oriented scheme such as a layered video coding scheme cannot provide for such a situation. As indicated above, in such a scheme all available information may be required from the most important source entities at the expense of receiving little, if any, information from the less important source entities whereas having regard to the problem under consideration, at least some information is required from all the source entities, each being nominally of the same importance.

BRIEF SUMMARY OF THE INVENTION

Thus, according to one aspect of the present invention, there is provided a packet message source comprising: means arranged to include a respective packet message payload in each packet message of a sequence of packet messages; means arranged to associate a priority label with each successive packet message in said sequence in accordance with a predetermined cyclic sequence of such labels; said priority labels each representing one of a plurality of priority levels and the positions of the labels in the cyclic sequence being such as to maximise, for each label in the sequence, the number of consecutive lower priority labels between that label and the nearest label in the sequence of equal or higher priority; and means arranged to send such packet messages.

Advantageously, this will ensure that, when a number of such packet message sources are sending such packet messages and must contend for limited bandwidth such that packets are dropped as necessary in accordance with their priority labels, as far as possible packet messages representing regular updates from all the sources can be sent to a receiving client, rather then all the updates from a subset of the sources and few, if any, updates from the remaining sources as with the prior art.

A packet message system, a method of packet messaging and a method of operating a packet messaging system are also provided.

BRIEF DESCRIPTION OF THE DRAWINGS

Several embodiments of the invention will now be described, by way of example, having regard to the accompanying drawings, in which:

FIG. 1 illustrates a first embodiment according to the invention;

FIG. 2 illustrates a general purpose computer;

FIGS. 4A and 4B illustrates first procedural flowcharts;

FIG. 5 illustrates a second procedural flowchart, having regard to a second embodiment according to the invention;

FIGS. 9A and 9B illustrate a fourth procedural flowchart, having regard to a third embodiment according to the invention;

DETAILED DESCRIPTION OF EXEMPLARY EMBODIMENTS

Figure 3:
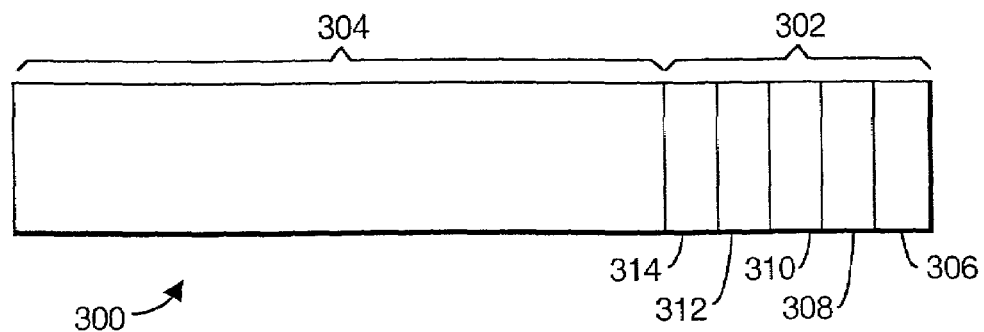
FIG. 3 illustrates a packet message structure.

A first embodiment according to the invention will now be described having regard to FIGS. 1, 2, 3 and 4. FIG. 1 illustrates in schematic form, a first embodiment architecture according to the invention. FIG. 4 illustrates a procedural flowchart of the functioning of this first embodiment.

Each one of a first group of source entities, each source entity having an associated state, creates and sends packet messages containing information as to its current state. The destination entity or entities to which the messages are sent will be discussed below. The source entities can take a wide variety of forms; one example of such a form is that of an entity hosted within a software process on a computer.

FIG. 1 thus illustrates, by way of example, a group of source entities 100 as being hosted within a first software process 102 on a first server computer 104.

Such a computer 104 is as illustrated in FIG. 2 and will typically have at least a central processing unit (CPU) 202, read-only memory (ROM) 204, random-access memory (RAM) 206, a storage device such as a hard disk 208, a device for reading from and writing to storage media such as a floppy disk drive 210 for reading from and writing to floppy disks and input and output ports 212 for connection to other devices or communications networks.

The computer 104 may utilise any suitable operating system, well known examples being Microsoft Windows™ NT, Linux or any one of the other many versions of Unix. Application programs may be written in any of many well known suitable languages in which to write application programs, one well known example of which is C++. Such an operating system and application programs may be loaded onto the storage device 208 of the computer 104.

Aspects of the functionality disclosed in accordance with the embodiments of the invention may be implemented as software application programs to be executed by the computer 104. This software application program may then be stored in any suitable computer readable storage media form, for example on a floppy disk 214, for loading into the computer 104, via the floppy disk drive 210, for execution. A well known alternative would be to store the software application on a CD-ROM (not shown) for loading into the computer 104 via a CD-ROM drive (not shown) for execution. A further well known alternative would be to download the software application program over a suitable network (not shown), for execution by the computer 104.

In this embodiment the computer 104 has one or more software application programs loaded onto it which, when executed, will cause the computer 104 to operate as such a host for source entities.

Often, there will be more than one such server computer. Accordingly a second group of source entities 100' is illustrated, hosted in a second software process 102' on a second server computer 104'.

As with the example of Quake above, the source entities could, for example, be creatures inhabiting a three-dimensional virtual environment, with different portions of the virtual environment running as processes on one or more of the server computers. By way of a simple example, a group of creatures in one room of a virtual environment might be represented by the source entities running in a process on one server computer and another group of creatures in another room of the virtual environment might be represented by the source entities running in another process on a second server computer.

As indicated above, each source entity 100 has an associated state; in this example each character will have at least an associated position within the virtual environment. Thus, each character, moving about in the three-dimensional virtual environment, may create and send packet messages as to their respective current positions in the three-dimensional virtual environment.

An example of the structure of such a packet message is illustrated in FIG. 3. As is conventional, the packet message 300 has both a header portion 302 and a payload portion 304. It is to be noted that not all the fields in the packet header 302 will be simultaneously required for all the embodiments of the invention.

A first field 306 in the packet header 302 contains an indication of the identity of the source entity. A second field 308 in the packet header 302 contains an indication of the identity of the intended destination entity. With only one destination in this first embodiment, this field need not be set. A third field 310 in the packet header 302 contains an indication of assigned priority, on a given priority scale.

According to the invention, the third field 310, identifying a priority setting, will be set as follows. Each individual packet message is assigned a priority label, each priority label representing one of a plurality of priority levels. Successive packets, considered in the sequence in which they were generated by each packet message source, are allocated one of these priority labels in accordance with a predetermined cyclic label sequence. Crucially, the positions of the labels in this cyclic sequence are such as to maximise, for each label in the sequence, the number of consecutive lower priority labels between it and the nearest label in the sequence of equal or higher priority.

The cyclic priorities thus vary such that if packets were discarded on a priority basis, the remaining packets in the notional sequence would be left as evenly spaced with respect to the original sequence as possible. It will be noted that sequence lengths of powers of two are advantageous in this respect.

For a simple example with a priority scale of 0 (lowest priority) to n (highest priority) and where n=7, a corresponding suitable cyclic variation in priority is a sequence of eight messages (equally spaced in time) with priorities set at 0, 7, 2, 4, 1, 6, 3 and 5 respectively. The 0, 7, 2, 4, 1, 6, 3, 5 sequence will ensure that as successive low priorities have to be dropped the remaining packets will be as evenly spaced as possible. By way of example, if half the packets had to be dropped from such a sequence of eight messages due to a traffic load of twice link capacity (thus becoming [ ], 7, 2, 4, 1, 6, 3, 5 then [ ], 7, 2, 4, [ ], 6, 3, 5 then [ ], 7, [ ], 4, [ ], 6, 3, 5, and finally [ ], 7, [ ], 4, [ ], 6, [ ], 5) it will be seen that the remaining packets are still equally spaced in time and will neatly provide updates every two temporal periods, rather than every temporal period as with the original sequence.

A fourth field 312 in the packet header 302 contains an indication of a so-called time-to-live. The time-to-live would be indicated as a given period of time, ranging, for example, up to a couple of hundred milliseconds, rather than being indicated as a given number of link hops is often the case in packet networks. In the first embodiment this field is not set.

A fifth field 314 in the packet header 302 indicates a payload type. The payload type might be, for example, that for a position indication. In the first embodiment this field is not set.

The packet payload portion 304 carries data. In this example the typical payload will be a position indication.

Figure 4A:
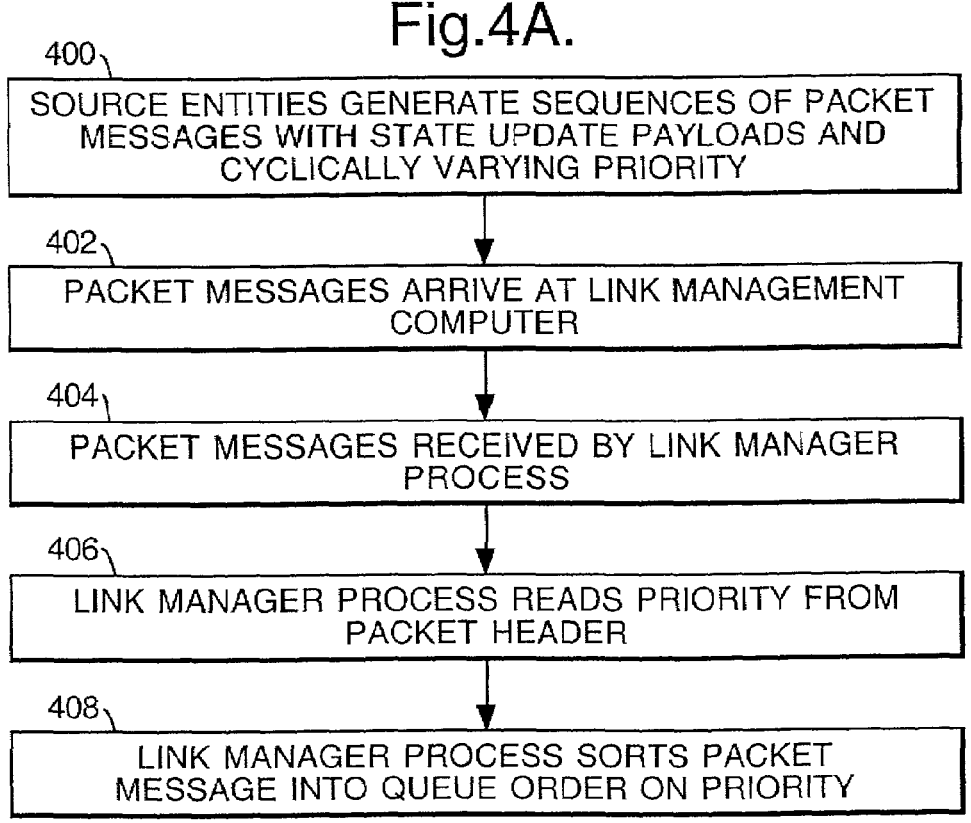

Having regard to FIG. 4A, in a first step 400 then, a source entity creates and sends a stream of such packet messages, carrying positional updates in the packet payloads and cyclically varying priorities in the fourth field of the packet headers.

Returning to FIG. 1, the first and second server computers 104, 104' will have first and second server computer output ports 106, 106' respectively. These respective first and second server computer output ports 106, 106' are connected by respective first and second high-bandwidth links 108, 108' to a communications link interface, link management computer 110. Such high-bandwidth links 108, 108' may typically take the form of, for example, Fast Ethernet, with an associated bandwidth of, for example, 100 Mbits per second.

The link management computer 110 may take the form of a general purpose computer as illustrated in FIG. 2. The link management computer 110 may utilise any suitable operating system, well known examples being Microsoft Windows™ NT, Linux or any one of the other many versions of Unix. Application programs may be written in any of many well known suitable languages in which to write application programs, one well known example of which is C++. Such an operating system and application programs may be loaded onto a storage device 208 of the computer 110.

The functionality disclosed in accordance with the embodiments of the invention may be implemented as software application programs to be executed by the link management computer 110. This software application program may then be stored in any suitable computer readable storage media form, for example on a floppy disk 214, for loading into the computer 110, via the floppy disk drive 210, for execution. A well known alternative would be to store the software application on a CD-ROM (not shown) for loading into the computer 110 via a CD-ROM drive (not shown) for execution. A further well known alternative would be to download the software application program over a suitable network (not shown), for execution by the computer 110.

The link management computer 110 has at least one input port 112, through which the link management computer receives the packet messages sent by the source entities. In this example, with two server computers 104, 104', first and second link management computer input ports 112, 112' are illustrated. it will be appreciated that these first and second link management computer input ports 112, 112' may be either separate physical ports or a shared physical port separated at the software level.

In a second step 402, the packet messages sent by the source entities hosted in the first and second server computers 104, 104' are thus sent to the link management computer 110 via the respective first and second server computer output ports 106, 106', the first and second fast links 108, 108' and the first and second link management computer input ports 112, 112'. The links between the respective server computers and link management computer are of a sufficiently high bandwidth that the packet messages sent by the source entities can be carried to the link management computer with a delay which is insignificant compared to the further downstream delays.

In this embodiment the link management computer 110 has one or more software application programs loaded onto it which, when executed, will cause the link management computer to run a Link Manager process 114. The appropriate steps of the procedural flowcharts will be carried out through execution of the software application programs.

In a third step 404, the Link Manager process 114 receives the packet messages arriving at the first and second link management computer input ports 112, 112'. In a fourth step 406, the Link Manager process 114 reads the priority setting from the fourth field 312 of the packet headers 302 of the received packets.

In a fifth step 408, the Link Manager process 114 sorts the packet messages that arrived at the first and second link management computer input ports 112, 112' into a simple sorted linear packet queue 116 ordered on priority. The packet message might, for example, be sorted into the queue 116 at the rear of the group of packet messages with the same priority setting. It will be appreciated that, by way of an alternative, the portions of the simple queue 116 with the same priority settings could just as easily be queued, in an optimised implementation as separate queues for each priority setting.

It will be appreciated that in a further step (not shown), the length of the packet queue 116 could be checked, and packet messages being stored as to increase the length of the queue 116 beyond a predetermined limit queue length could be discarded.

The link management computer 110 also has at least one output port 118.

The output port 118 of the link management computer 110 is connected, by means of a link 120 of known Quality-of-Service and, in particular, a known low-bandwidth, to, for example, an input port 122 of a receiving entity host computer 124. When the Link Manager process 114 sends the packet message at the head of the priority queue 116 to the link management computer output port 118, the message is then transmitted over the communication link 120 to the receiving entity host computer 124, which can then pass the message to the receiving entity (not shown).

Having regard to FIG. 4B, in a step 410, the Link Manager will test to see if there is spare capacity on the low bandwidth link to send the packet message at the head of the queue 116. If there is, in a further step 412, the Link Manager process 114 will send the packet message at the head of the priority queue 116 to the link management computer output port 118 and out onto the link 120. If there is not, then step 410 will be repeated. This is done as an intelligent selection of packet messages has effectively been made at the link manager according to the invention through the cyclic priority scheme; overloading the link might simply cause a return of random packet message loss, losing the fruits of the invention.

It will be appreciated that the sending of the packet message at the head of the queue 116 will thus involve a loop process. The Link Manager process 114 must wait until the current head of queue packet message has been sent before attempting to send the next head of queue packet message. This might be achieved, for example, with the Link Manager process ascertaining the size of the packet message at the head of the queue 116, which can then be used, with a knowledge of the Bandwidth of the link 120, to compute how long the head of queue packet message will take to be sent. By way of an alternative, the packet messages for sending could be sent from a buffer, into which a following packet message cannot be written till the previous packet message has cleared the buffer.

A typical low-bandwidth link 120 might, for example, be a 33.6 kbits per second Modem link over a Public Switched Telephone Network (PSTN) connection or a 128 kbits per second Integrated Services Digital Network (ISDN) connection.

By way of example, the receiving entity host computer 124 might run a process which hosts an entity intended to receive the messages sent by the source entities. It will be appreciated however, that instead of the receiving entity host computer, a receiving entity might instead take a wide variety of forms, not even having to take a computationally capable form, for example, a simple data store.

For as long as the total bandwidth of the packet message traffic received by the link management computer 110 at any given time has been less than the known low-bandwidth of the communication link 120, all packet messages placed in the Link Manager process queue 116 will be sent out on the link 120 with no queuing delay. The receiving entity will receive all the packet messages sent from all the source entities with the lowest possible delay (which will result only from the network delay).

It may be the case, however, that increasing numbers of source entities 100, 100' become active, resulting in a commensurately increased flow of messages. Alternatively, the source entities 100, 100' themselves may become more active, resulting in the need for state update messages with reduced periodicity. In either case, as the amount of packet message traffic increases, there will come a point when the total bandwidth of the incoming packet message traffic exceeds the bandwidth of the communication link 120. At this point it will no longer be possible to send on simultaneously all the packet messages intended for the receiving entity.

The packet messages will now begin to be queued by the Link Manager process 114, ordered, as indicated above, on the basis of priority. As new packet messages arrive at the link management computer 110 they will be sorted into the section of the queue appropriate to the priority setting carried in their packet header 302.

The discussion as to the cyclic priority settings of the sequences of packet messages sent out from the source entities 100, 100' will be recalled. The example was provided above, of the management of the selecting of packets for sending on a link with a traffic load running at twice link capacity. If half the packets were dropped from a sequence of eight messages with cycled priority sequences of the form 0, 7, 2, 4, 1, 6, 3, 5 due to a traffic load of twice link capacity (thus becoming [ ], 7, 2, 4, 1, 6, 3, 5 then [ ], 7, 2, 4, [ ], 6, 3, 5 then [ ], 7, [ ], 4, [ ], 6, 3, 5, and finally [ ], 7, [ ], 4, [ ], 6, [ ], 5) it was seen that the remaining packets were still equally spaced in time and would neatly provide updates every two temporal periods, rather than every temporal period as with the original sequence.

Thus when the Link Manager process 114 begins to queue packet messages on a priority basis, it will effectively begin to drop (or rather queue) the lower priority messages whilst sending on the higher priority messages, in an cyclic order similar to the example given above. In this way, a link management computer 110 according to this embodiment of the invention, with an increasingly congested link 120, will be able to continue to send regular state updates from all the source entities 100, 100'. Naturally, these updates, whilst remaining regular, will become less and less frequent with rising low-bandwidth link 120 congestion, but this gradual falling away of frequency indicates the graceful manner in which the degradation of service takes place.

Figure 10:
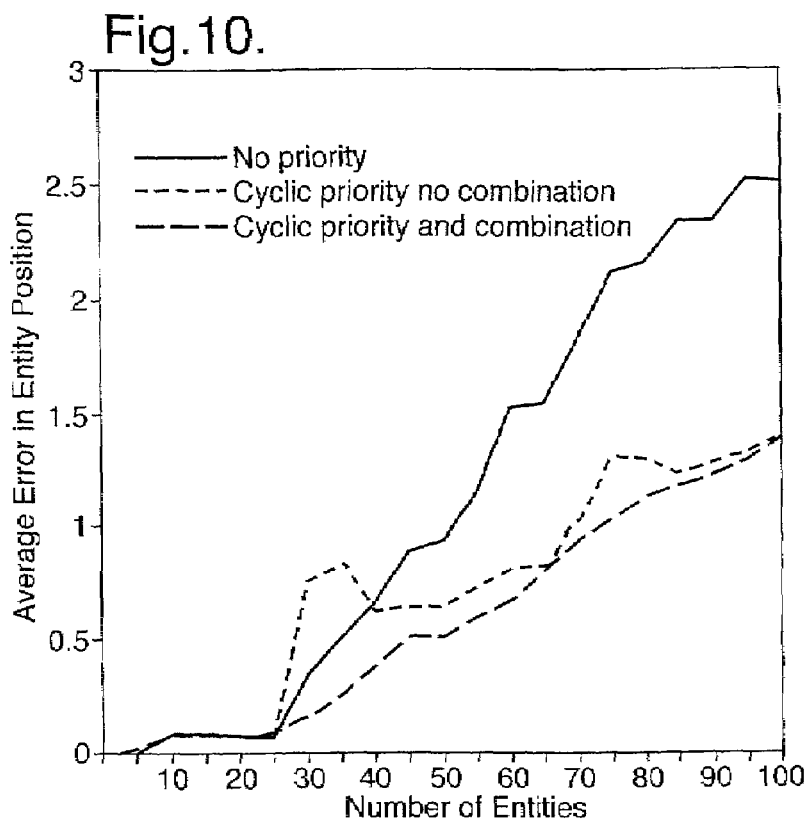
FIG. 10 illustrates a third graph, showing performance results for the third embodiment.
Figure 11:
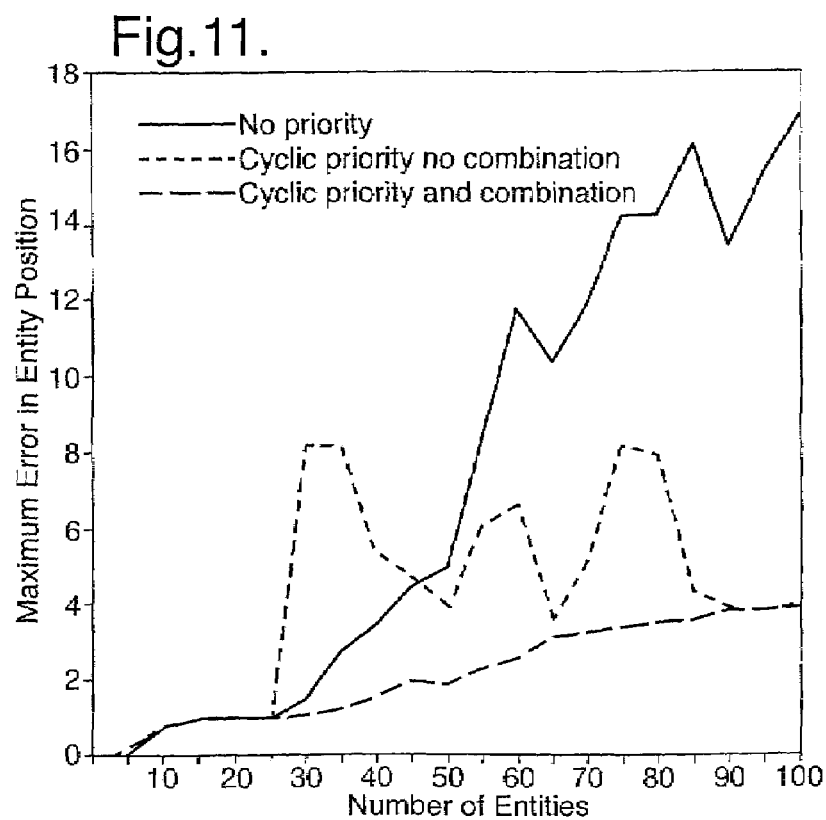
FIG. 11 illustrates a fourth graph, showing further performance results for the third embodiment.

Simulated performance results for this first embodiment will be discussed below having regard to a comparison with the performance results of the third embodiment illustrated in FIGS. 10 and 11.

Figure 6:
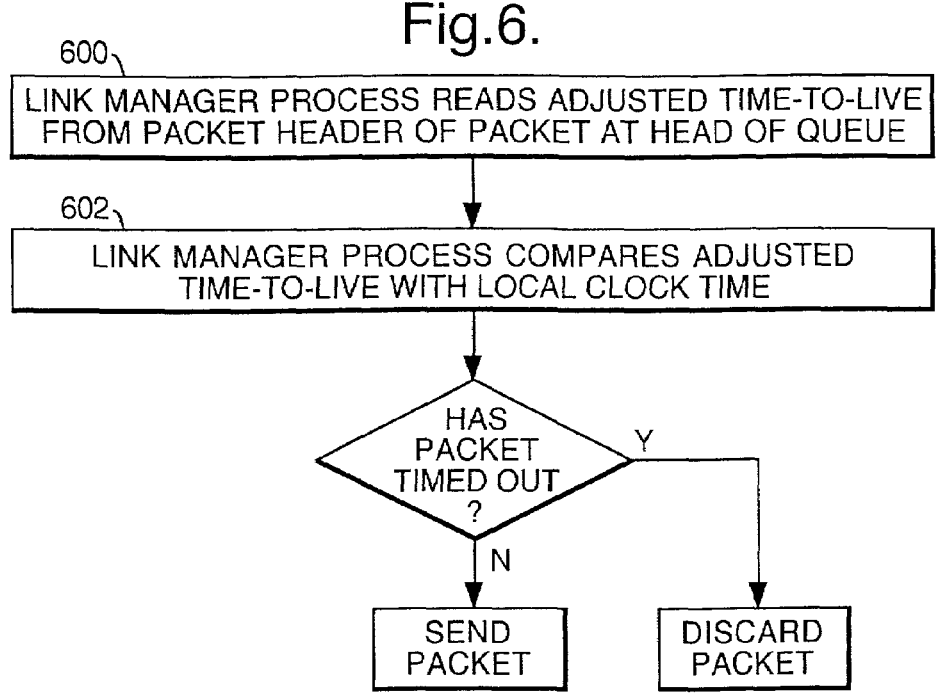
FIG. 6 illustrates a third procedural flowchart, having regard to the second embodiment according to the invention.

A second embodiment according to the invention will now be discussed having regard to FIGS. 1, 2, 3, 5, 6, 7 and 8. This second embodiment differs from the first only in terms of the structure of the packet messages 300 sent by the source entities 100, 100' and in the functionality of the Link Manager process 114, so reference should again be made to FIGS. 1, 2 and 3 where appropriate. FIGS. 5 and 6 illustrate procedural flowcharts of aspects of functioning of this second embodiment according to the invention. Again the appropriate steps of the procedural flowcharts will be carried out through the execution of the software application programs running on the link management computer 110.

According to this second embodiment and having particular regard to FIGS. 1 and 2, the source entities 100, 100' transmit packet messages 300 with the following structure. The first field 306 in the packet header 302 will be set with the identity of the sending source entity. The second field 308 in the packet header 302, identifying a destination entity, need not be set as there exists only one destination entity in this example.

The third field 310, identifying a priority setting, will be set as with the first embodiment. Each individual packet message is assigned a priority setting on a scale of for example, 0 (lowest priority) to n (highest priority). Again crucially, a sequence of n+1 such messages is sent out from the source entity, not with a fixed priority assigned to the source entity in question, but with cyclically varying priorities. The cyclic priorities vary such that if packets were discarded on a priority basis, the remaining packets in the sequence would be left as evenly spaced with respect to the original sequence as possible.

Again, for a simple example where n=7, a corresponding suitable cyclic variation in priority is a sequence of eight messages with priorities set at 0, 7, 2, 4, 1, 6, 3 and 5 respectively. As indicated above, the 0, 7, 2, 4, 1, 6, 3, 5 sequence will ensure that as successive low priority packet messages have to be dropped, the remaining packet messages will be as evenly spaced with respect to the original sequence as possible.

In this second embodiment the fourth field 312 will be set with a time-to-live period. It will be appreciated that rather than all source entities needing to have the same packet message sending periodicity, varying time-to-live indications allow each source entity to set their own periodicity.

For example, as a result of its nature, a given source entity might only need to send updates every 20 nominal time periods, in which case a time-to-live period could be set at 20 nominal time periods. After 20 such nominal time periods, the given source entity will send out a new update so the older update may be discarded.

In this second embodiment, the fifth field 314 in the packet header 302, giving an indication of the packet payload type, is not set.

Streams of such packet messages, bearing cyclic priority settings, as discussed above, are sent out from the source entities 100, 100'. These packet messages are then passed, via the respective first and second server computer output ports 106, 106' and first and second links 108, 108', to the link management computer 110. Having regard to FIG. 5, in a first step 500, after these packet messages are received at the first and second link management computer input ports 112, 112', they are passed to the Link Manager process 114.

The Link Manager process 114 will again maintain a simple packet message queue 116, ordered on priority, as with the first embodiment.

The Link Manager process 114 is provided with a clock (not shown) keeping a local time measured cyclically in, for example milliseconds. In a second step 502, the Link Manager process 114 reads the time-to-live label in the fourth field 312 of the respective packet headers 302 and in a third step 504, adds the local clock time to the time-to-live label assigned by the source entity, to create an adjusted time-to-live. In a fourth step 506, this adjusted time-to-live is then written back into the fourth field 312 of the packet header 302.

It will be appreciated that, by way of an alternative, the packet message and an associated arrival time could instead be stored together in the queue 116. This would have the advantage of not writing over the source entity set time-to-live but would have the disadvantage of a commensurately larger queue memory requirement.

It will be appreciated that the only significant delay which may be experienced by a given packet message will be that resulting from being held in a queue. If, by way of the example used above, a given packet message is received by the Link Manager process 114 with a time-to-live indication of 20 nominal units and the Link Manager process local time was t=100 nominal units, then the adjusted time-to-live written into the fourth field of the packet header would be 120 nominal units. If, for reasons discussed below, this packet message was queued for more than the 20 nominal units lifetime, by which time the Link Manager process local time would be t=120 nominal units, then the packet message should be timed-out. The source entity should have sent, and the Link Manager process 116 should have received, another packet message by this time.

In a fifth step 506, the Link manager process 114 also reads each priority setting in the third field 310 of the respective packet headers 302 and then, in a sixth step 510, sorts the packet messages into the simple queue 116 ordered on the basis of the priority setting. Again, the packet message might, for example, be sorted into the queue 116 at the rear of the group of packet messages with the same priority setting. As indicated above, again, by way of an alternative, the portions of the simple queue 116 with the same priority settings could be queued separately.

The process illustrated in FIG. 6 is to be understood as being executed in parallel with that illustrated in FIG. 5.

Having regard to FIG. 6, in a first step 600, as each new packet message moves up to the head of the queue 116 for sending onto the link 120, the Link Manager process 114 will again read the adjusted time-to-live label from the fourth field 312 of the packet header 302 of the packet message at the head of the queue 116.

In a second step 602, the Link Manager 114 will compare this adjusted time-to-live with the Link Manager process local time. In a third step 604, if the Link Manager process local time has passed the adjusted time-to-live of the packet message, then that packet message must be considered as being timed-out and will be discarded by the Link Manager process 114. If, however, the Link Manager process local time has not passed the adjusted time-to-live of the packet message, then the packet message will not have been queued for longer than its assigned time-to-live and in a fourth step 606, will next be sent, via the output port of the link management computer 118, onto the link and to the receiving entity at the client 120. The Link Manager process 114 will again test the link 120 for capacity to send the packet message at the head of the priority queue 116 in doing so, as with the first embodiment.

It will be appreciated that for optimal utilisation of the bandwidth available on the low-bandwidth link, a step of header compression (not shown) may take place. Portions of the header 302 no longer necessary since the packet message is to be sent out over the low-bandwidth link 120, for example, the priority setting, may be stripped off.

As with the first embodiment, for as long as the instantaneous total bandwidth of the packet message traffic received by the link management computer 110 has been less than the known (low) bandwidth of the communication link 120, all packet messages placed in the Link Manager process queue 116 will be sent out on the link with no queuing delay. The receiving entity 124 will receive all the packet messages sent from all the source entities 100, 100'. Again, however, as with the first embodiment, as the amount of packet message traffic increases, there will come a point when the total bandwidth of the incoming packet message traffic exceeds the bandwidth of the communication link 120. At this point it will no longer be possible to send on simultaneously all the packet messages intended for the receiving entity.

The second embodiment according to the invention will provide all the advantages of the first embodiment according to the invention in terms of the cyclic priority settings being able to deliver an optimal and graceful degradation of service as the total traffic bandwidth exceeds the low-bandwidth link capacity. The second embodiment according to the invention will, however, provide yet further advantages in terms of performance over the first embodiment, as will now be explained.

The assignment of a time-to-live for each message allows the avoidance of an erroneous re-ordering of messages as follows.

A first positional packet message is sent from a given source entity at a nominal t=0 with a priority setting of 0. A second packet message is sent at nominal t=1 with a priority setting of 7. A third packet message is sent at nominal t=2 with a priority setting of 2. If, due to a degree of congestion on the low bandwidth link 120, the first packet message, with the lowest priority setting of 0, is not sent over the link by the Link Manager process 114 when it is received, it will instead be queued. Upon receipt of the second and third packet messages, with respective priority settings of 7 and 2 respectively, the Link Manager process 114 sends the second and third packet messages straight out over the low bandwidth link 120 to the receiving entity host computer. If the congestion on the low bandwidth link 120 had then eased and if the first packet message had not had a limited time-to-live associated with it, the Link Manager process 114 might then have sent the first message over the low bandwidth link to the receiving entity host computer.

Had the Link Manager process 114 done so, it would have had the result that the latest positional update message received by the client would in fact have dated from one and two time periods respectively before the positional updates carried by the second and third messages which had already been received by the client. Instead, the time-to-live label on the message will cause the message to be discarded from the Link Manager process queue 116 before it can be sent over the low bandwidth link 120.

It will be appreciated, as indicated above, that the longest delay, indeed the only significant delay, the packet message will experience before transmission, is that resulting from being queued. The time-to-live label, apart from its advantage in the prevention of an erroneous re-ordering of packet messages as explained above, is also of more general assistance in queue memory management. The packet message queue 116 could be swept, for example, when the queue 116 reaches a certain predetermined length. Memory space otherwise taken up by timed-out packet messages may thereby be freed up. It would still be necessary, however, to check for timing-out on the sending of each packet. Alternatively, the queue 116 could be swept before it had reached this certain length. This would free up memory space otherwise taken by timed-out packets that might otherwise have lived on in a queue 116 shorter than the certain length.

The fruits of this approach to management of the low bandwidth link by the Link Manager process, combining cyclic priority settings with time-to-live labels are well demonstrated in and will be discussed having regard to, FIG. 7 and FIG. 8.

A simulation was created as follows. A 'Server' process was set up on a single PC, with a small number of initial entities, each of which possess position state. A 'Client' process was set up with an identical state on the same machine and the two were connected via a 28.8 Kbit/s UDP/IP link via a 'reflector' machine (simply bouncing packets from the server back to the client).

The Server moved all the entities in random directions at a constant rate and, at a fixed periodicity for each entity (and hence accordingly, the assigned time-to-live for the packet messages of each entity), each sent a position update to the client. The cyclic priority settings in this example used n=3, i.e. a four level priority scheme. The efficiency of the state transfer can then be measured by assessing the difference between the server and client state. With a perfect link (infinite bandwidth and zero latency) the states would be identical. With a non-perfect link the states will differ, and this difference can be measured by applying Pythagoras's rule to determine the distance between server and client entity positions.

This state difference for a given number of entities can be expressed as either.
1. An average of all the server-client position differences over a long period of time.
2. The average of the maximum server-client position differences over a long period of time.

As the number of entities is increased the volume of state updates generated is increased, and hence the greater the load imposed on the server to client link.

The approaches of sending with no priority and sending with a four level cyclic priority behave much the same with up to 25 entities sending data. This is because below 25 entities all the state updates generated within a fixed time period can be sent over the server to client link in the same period.

As the number of entities increases, and hence the volume of traffic sent to the client increases, the error detected for the non-prioritised case rapidly deteriorates. This is because the UDP link discards excess data, essentially making a random selection of the supplied updates. One entity might manage to transmit a sequence of 10 position updates successfully, whilst another manages to get none through over the same period.

In contrast, between 25 and 95 entities the cyclic priority scheme shows a large improvement in both the average and the maximum error detected. This is because use of the cyclic priority ensures that when link bandwidth is exceeded each sending entity gets a fair sub-division of what is available. For example, when generated traffic is three times the available bandwidth (75 entities) the maximum error is around 4 times worse for the non-prioritised case.

When the volume of traffic generated equals the link bandwidth multiplied by the number of priority levels then the priority scheme approach degenerates to the same error level as the non-prioritised approach. This is because not enough bandwidth is available to carry all the top priority state updates, and hence which updates are selected once again becomes a function of the network. This can be clearly seen on the maximum error graph, as the number of entities approaches 100.

A third embodiment according to the invention will now be discussed having regard to FIGS. 1, 2, 3, 9, 10 and 11. This third embodiment differs from the first and second only in terms of the structure of the packet messages sent by the source entities and in the functionality of the Link Manager process, so appropriate reference should again be made to FIGS. 1, 2 and 3 where appropriate. FIG. 9 illustrates a procedural flowchart of aspects of functioning of this second embodiment according to the invention. Again, the steps of the procedural flowchart will be carried out through execution of the software application programs running on the link management computer.

According to this third embodiment and having particular regard to FIG. 3, the source entities 100, 100' transmit packet messages 300 with the following structure. The first field 306 in the packet header 302 will be set with the identity of the sending source entity. The second field 308 in the packet header 302, identifying a destination entity, need not be set as there exists only one destination entity in this example.

The third field 310, identifying a priority setting, will again be set as with the first and second embodiments. Each individual packet message is assigned a priority setting on a scale of for example, 0 (lowest priority) to n (highest priority). Again crucially, a sequence of n+1 such messages is sent out from the source entity, not with a fixed priority assigned to the source entity in question, but with cyclically varying priorities. The cyclic priorities vary such that if packets were discarded on a priority basis, the remaining packets in the sequence would be left as evenly spaced as possible.

Again, a simple example where n=7, a corresponding suitable cyclic variation in priority is a sequence of eight messages with priorities set at 0, 7, 2, 4, 1, 6, 3 and 5 respectively. The 0, 7, 2, 4, 1, 6, 3, 5 sequence will ensure that as successive low priorities have to be dropped, a message with priority 0 being dropped first followed by a message with priority 1 and so on, the remaining packets will be as evenly spaced as possible.

In this third embodiment the fourth field 312, giving a time-to-live period, will not be set. In this third embodiment however, the fifth field 314 in the packet header 302, giving an indication of the packet payload type, is set.

It will be recalled from the above discussion of the second embodiment that the setting of a time-to-live period by a sending source entity corresponded with the periodicity of the source entity. The example given above had a source entity sending packet messages every 20 nominal temporal units with a corresponding time-to-live of 20 nominal temporal units. Each packet message carrying a state update need not live longer than the source entity sending period since after another such period of time, a new state update packet message will have been sent.

In this third embodiment a time-to-live period is not set. Instead each source entity sends out state update messages with the fifth field 314 of the packet header 302 set with an identification of the packet payload type, which in this example will be a position indication. Each source entity will thus send out state update packet messages only when it is necessary.

According to this third embodiment, the Link Manager process 114 screens the incoming aperiodic packet messages, such that packet messages from the same source entity with the same payload type can be combined to make a new packet message with the latest possible state update.

Thus, streams of such packet messages, again bearing cyclic priority settings, as discussed above, are sent out from the source entities 100, 100'. As with the first embodiment, these packet messages are then passed, via the respective server computers 104, 104', to the link management computer 110.

Having regard to FIG. 9, in a first step 900, after these packet messages are received at the first and second link management computer input ports 112, 112', they are then passed to the Link Manager process 114.

In a second step 902, when a new packet message is received at one of the link management computer input ports 112, 112', the Link Manager process 114 will read the first field 306 of the packet header 302, to determine the identity of the sending source entity. It will be recalled that in this embodiment, the second field 308 in the packet header 302, identifying a destination entity, is not set as there exists only one destination entity in this example. In a third step 904, the Link Manager process 114 also reads the fifth field 314 in the packet header 302, giving an indication of the packet payload type, which in this example will be a position indication. In a fourth step 906, the Link Manager process 114 also reads the third field 310 of the packet header 302 giving the assigned priority setting.

The Link Manager process 114 will again maintain a simple packet message queue 116, ordered on priority as with the first and second embodiment.

In a fifth step 908, the Link Manager process 114 will then sweep this packet queue 116, reading the first and fifth fields 306, 314 in the queued packet messages packet headers 302, to determine whether or not a packet message which has been received from that source entity and bearing that type of payload is currently being queued. Since it is assumed that packet messages sent from source entities arrive at the link management computer 110 with no significant delay, it will be assumed that a later arriving packet message carries a more recent state update than an earlier arriving packet message.

It is to be noted that since this match is performed on, at least the sending source identity and the payload type, each sending source entity will be free to denote whatever payload type it requires with whichever payload type indicator is wished i.e. source A might choose to denote a position payload with type=1, whereas source B might denote a temperature payload, for example, with the same type type=1).

Accordingly, if the Link Manager process 114 locates such an earlier packet message, from the same source entity and bearing the same type of payload, which is still queued, then in a sixth step 910, the Link Manager process will read the third field 310 of the queued packet message packet header 302 giving the assigned priority setting.

In a seventh step 912 the Link Manager process 114 may create a new packet message as follows. Having regard to FIG. 2, the Link Manager process will write into the first field 306 of the packet header 302 of the new packet message, the common source entity identity read from the first field 306 of the packet header 302 of both the newly received packet message and the queued packet message. The Link Manager process 114 will write into the payload section 304 of this new packet message the payload of the packet message just received by the link management computer, in other words the most recent state update available. The Link Manager process 114 will compare the priority settings in the third field 310 of the packet headers 302 of the queued packet message and the newly received packet message and will write into the third field 310 of the packet header 302 of the new packet message, the higher of the two priorities of the queued packet message and the newly received packet message.

In an eighth step 914, the Link Manager process 114, having created such a new packet message then sorts this new packet message into the simple priority order queue 116.

In a ninth step 916, the Link Manager process 114 will discard the newly received packet message and the queued packet message.

By way of an alternative, it will be appreciated that instead of the seventh and eighth steps 912, 914, the process might be carried out as follows. If the queued packet message had a higher priority than the newly received packet, then the payload of the newly received packet message could simply be copied into the queued packet message payload with the newly received packet message then being discarded. If, however, the newly received packet had a higher priority than the queued packet message then the queued packet message could simply be discarded and the newly received packet message sorted into the priority queue 116.

Where the Link Manager process 114 does not find a match on the criteria then in a tenth step 918 the received packet message will simply be sorted directly into the queue 116.

With the third embodiment according to the invention, the Link Manager process 114 will again test the link 120 for capacity to send the packet message at the head of the priority queue 116 before sending, as with the first and second embodiments.

As with the first and second embodiments, for as long as the instantaneous total bandwidth of the packet message traffic received by the link management computer 110 has been less than the known (low) bandwidth of the communication link 120, all packet messages placed in the Link Manager process queue 116 will be sent out on the link 120 with no queuing delay. The receiving entity will receive all the packet messages sent from all the source entities. Again, as with the first and second embodiments, as the amount of packet message traffic increases, there will come a point when the total bandwidth of the incoming packet message traffic exceeds the bandwidth of the communication link 120. At this point it will again no longer be possible to send on simultaneously all the packet messages intended for the receiving entity.

The third embodiment according to the invention will provide all the advantages of the first embodiment according to the invention in terms of the cyclic priority settings being able to deliver an optimal and graceful degradation of service as the total traffic bandwidth exceeds the low-bandwidth link capacity. The third embodiment according to the invention will, however, provide yet further advantages in terms of performance over the first embodiment, as will now be explained.

The fruits of the approach to management of the low bandwidth link by the Link Manager process as discussed having regard to this third embodiment according to the invention are well demonstrated in and will be discussed having regard to, FIGS. 10 and 11.

Figure 7:
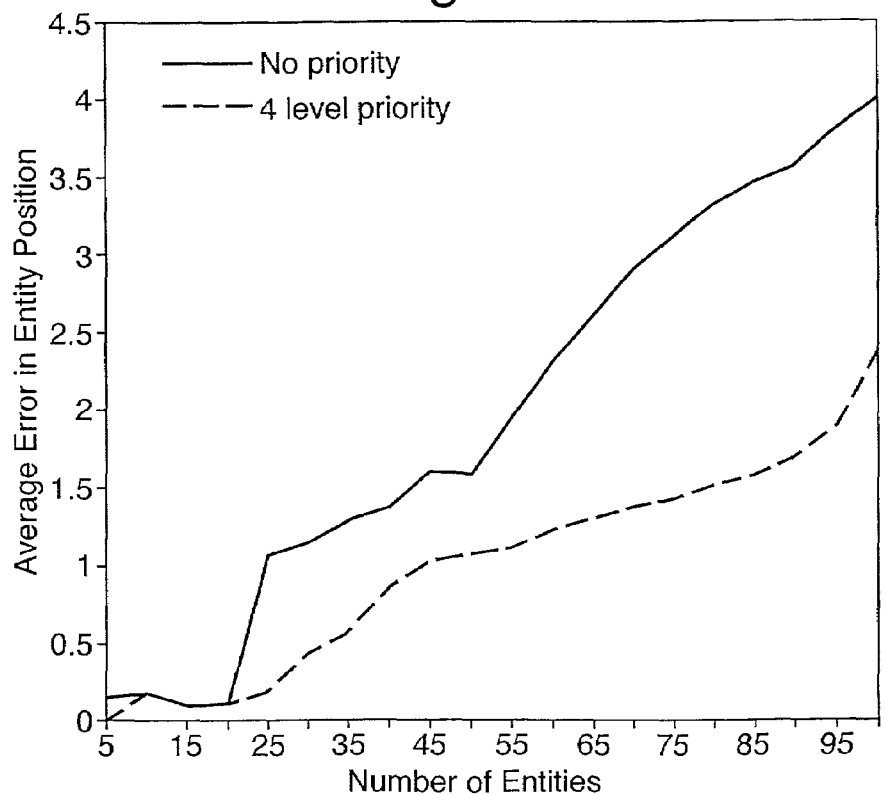
FIG. 7 illustrates a first graph, showing performance results for the second embodiment.
Figure 8:
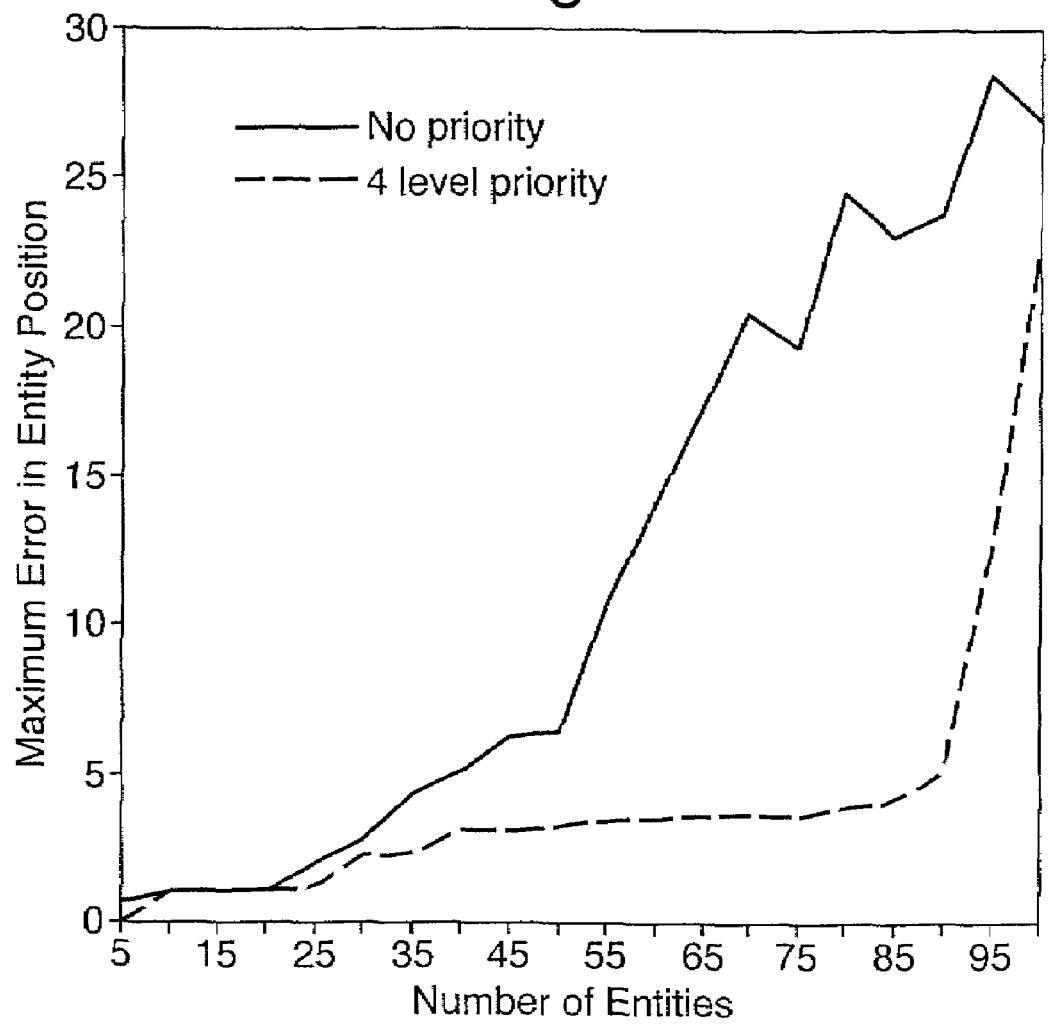
FIG. 8 illustrates a second graph, showing further performance results for the second embodiment.

A similar simulation to that discussed having regard to FIGS. 7 and 8 was conducted. This experiment shows the results of using no priority scheme at all, a cyclic priority scheme on its own, and a cyclic priority scheme with a message combination mechanism. In this example, a cyclic priority scheme with n=7, i.e. an eight level priority scheme, was used Not using any priority scheme performs adequately up to the point where the volume of traffic generated on the server exceeds the bandwidth available for updating the client (30 entities). From this point on both the average and maximum error increase as state updates are discarded at random by the network.

The result of using an 8 level priority scheme on its own is shown as a dotted line on both graphs. This performs significantly better than the none-prioritised case at some traffic volumes (e.g. 70 entities and 90 entities), and significantly worse at other traffic volumes (e.g. 35 entities). Each of the peaks in error from this data set correspond to when the traffic volume generated is equal to some integer multiple of the limited volume that can be carried between server and client. As discussed in an example above, the sequence of events that cause these peaks is:

1. At time t Entity X generates state update St with priority P.
2. St is queued because the link is currently fully utilised by higher priority updates.
3. At time t+1 Entity X generates state update with St+1 with priority>P.
4. St+1 is sent because it has a high enough priority to supplant any other queued traffic.
5. Fluctuation in the generation of new state updates allows lower priority updates that have been queued to be sent, St is sent, and the receiving entity on the client treats this as update St+2.

Hence these error peaks are only generated when fluctuations in the rate of state update generation can cause the above re-ordering case, i.e. when the traffic volume generated is close to some integer multiple of the available bandwidth, and one particular priority level is only occasionally making it onto the low bandwidth link.

This problem is resolved by the third embodiment according to the invention, shown as the dashed line on both graphs, wherein new messages are combined with any old queued messages from the same entity. Hence, the type of re-ordering problem outlined above is eliminated, and the scheme performs well at all traffic levels.

Having regard to FIG. 3, and in particular the second field 308 of the packet header 302, it will be appreciated that it is possible to send to multiple clients from a single link manager if respective different destination entity identities are provided. The Link Manager process may then maintain multiple sorted priority packet message queues, on the basis of, for example, one such queue per client.

Thus the destination entity identity field may be used by the link manager to determine which queue any incoming packets should be placed in. Having used the packets destination field to determine the relevant queue, the link manager may then utilise the mechanisms previously described to place the packet in the queue and then either deliver or discard it. It will be appreciated that once the link manager supports multiple clients, and hence multiple priority sorted packet queues, it will need to round-robin between these queues, allowing each of them processing time to send any packets from the head of their queue that the link to their client may carry at that moment in time.

Figure 12:
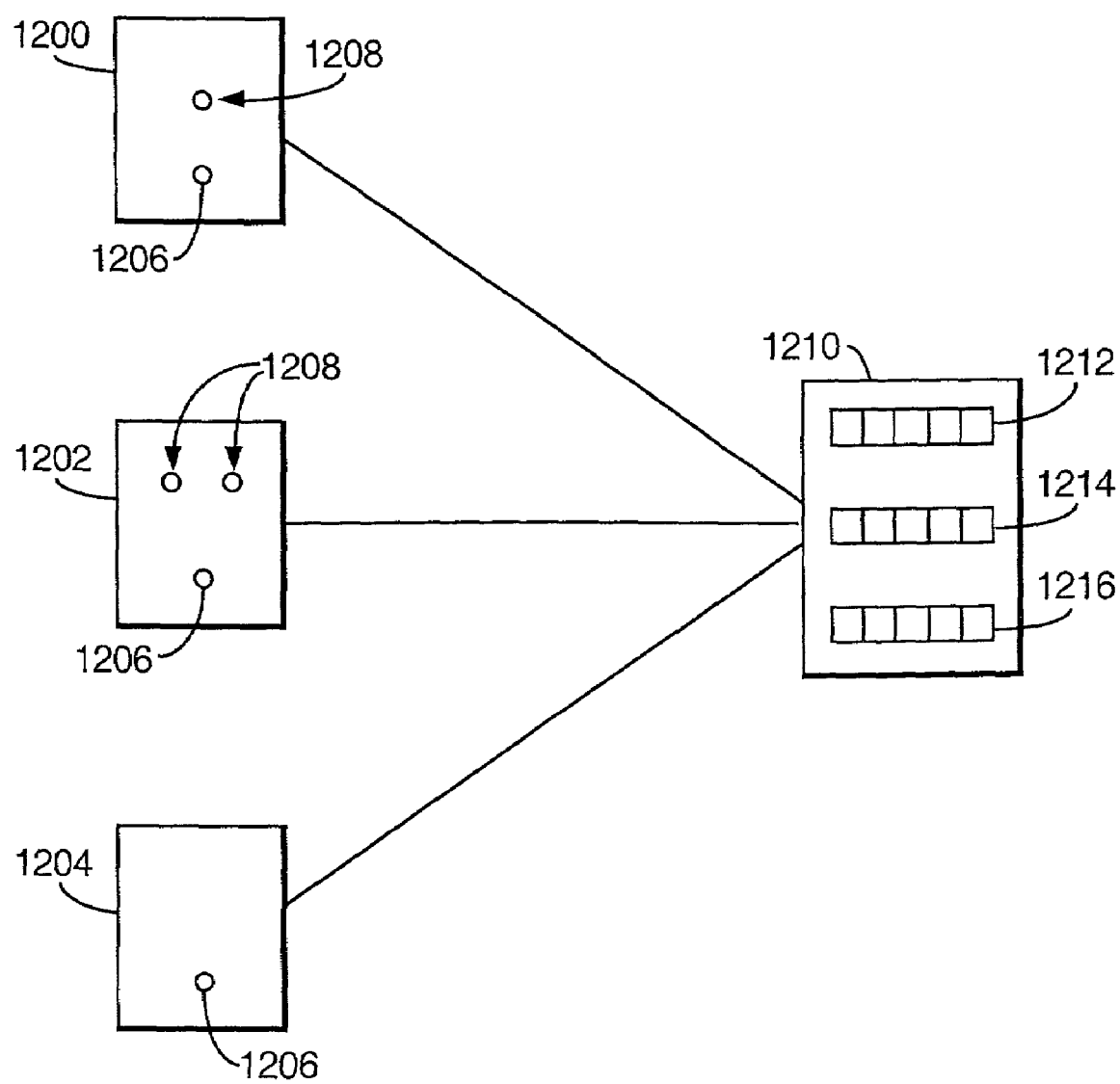
FIG. 12 illustrates a fourth embodiment according to the invention.

FIG. 12 illustrates a fourth embodiment according to the invention.

Each client 1200, 1202, 1204 is treated as a single receiving entity 1206, and has zero or more sending entities 1208 resident on it. All clients are connected to a link manager 1210. Each client 1200, 1202, 1204 can generate any number of updates from any of its sending entities, and address these to any of the other client receiving entities. Each update is sent to the link manager 1210, and this has the task of distributing the incoming updates to the relevant clients 1200, 1202, 1204. Since any single client 1200, 1202, 1204 may be receiving updates from numerous other clients 1200, 1202, 1204 a fan-in type problem occurs, whereby each client is only generating a limited number of updates, but particular clients are being sent a larger number of updates than the bandwidth of their network connection allows.

To handle this problem effectively the link manager 1210 maintains a priority sorted queue 1212, 1214, 1216 for each client, and this queue 1212, 1214, 1216 is emptied down to the client 1200, 1202, 1204 at whatever bandwidth the link manager to client link can support. These queues 1212, 1214, 1216 are managed using the previously described cyclic priority scheme, whereby each update is allocated a priority by the client as its generated, together with either a time to live or a payload type. Hence, if any client is being sent more updates than its link bandwidth will allow it to receive the link manager will act to ensure that graceful degradation in the periodicity of the updates received occurs.

This approach assumes that the upstream traffic generated from client to link manager will not exceed the available link bandwidth. i.e. that the client can regulate the periodicity of updates generated by the sending entities to ensure the total traffic generated in any single time period remains below the maximum it can transmit within that same period. If this is not the case then an identical scheme to that employed at the link manager can be adopted for use at the client i.e. a priority sorted queue, messages sent from its head at whatever rate the link bandwidth allows, and with a time to live or data combination approach used to constrain the queue size and prevent message re-ordering.

In this implementation each message would pass through up to two queues, one before leaving the client, and one at the link manager whilst awaiting delivery to a client. Note that if using a time to live approach with this double queuing scheme, then the time to live in the message must be correctly adjusted before a message is sent. For example, if a message is generated at t=0 with a TTL of 20, and remains in the client-side queue for 5 time periods, then it should be sent up to the link manager with a TTL of 15 (i.e. Original TTL minus the time spent in the queue).

Whilst the above embodiments have illustrated techniques where a priority label is assigned to each packet message by a source, this need not always be the case. So long as the sequence order in which packet messages are transmitted by a source is preserved (for example, a sequence order field), an allocation of the priority labels could be performed downstream of the sources. Indeed, given that priority labels are allocated for the purposes of making decisions about which part of the packet message queue to sort a received packet message into, the sorting algorithm (utilising the cyclic label sequence technique as above and with knowledge of the sequence position of a given received packet message from a given source) might be used to sort a received packet message into the same portion of the queue as would have been performed in two steps as above, with an assignment of an appropriate priority label and a priority based sorting into a queue.

The invention claimed is:

1. A packet message source comprising:
   means arranged to include a respective packet message payload in each packet message of a sequence of packet messages;
   means arranged to associate a priority label with each successive packet message in said sequence in accordance with a predetermined cyclic sequence of such labels; said priority labels each representing one of a plurality of priority levels and the positions of the labels in the cyclic sequence being controlled to maximize the number of consecutive labels having a lower priority than a nearest other label in the sequence of equal or higher priority with a label of a given priority occurring only once in each cycle; and
   means arranged to send such packet messages.

2. A packet message source as claimed in claim 1, wherein said packet message source has an associated dynamic state and said respective packet message payload comprises a source state update message.

3. A packet message source as claimed in claim 1 further comprising:
   means arranged to associate a time-to-live label with each packet message.

4. A packet message source as claimed in claim 1 further comprising:
   means arranged to associate a packet message source identity with each packet message; and
   means arranged to associate a packet message payload type setting with each packet message.

5. A packet messaging system comprising:
   a plurality of packet message sources according to claim 1; and
   a communications link interface;
   said communications link interface comprising:
   an input port for receiving packet messages from said plurality of packet message sources;
   means arranged to read a priority label associated with each received packet message;
   a queue for queuing received packet messages in descending order of their associated priority labels; and
   an output port for sending each packet message at the head of said queue onto a communications link.

6. A packet messaging system according to claim 5 wherein a packet message source having means arranged to associate a time-to-live label with each packet message, and said communications link interface further comprising:
   means arranged to read a packet message time-to-live label associated with each received packet message;
   means arranged to associate with each respective packet message an indication of the period of time that packet message has been queued; and
   means arranged to discard each packet message whose associated indication indicates that that packet message has been queued for a period of time longer than the associated packet message time-to-live label.

7. A packet messaging system according to claim 5 wherein a packet message source having means arranged to associate a time-to-live label with each packet message, and said communications link interface further comprising:
   a clock; and
   means arranged to replace the packet message time-to-live label associated with each packet message with an adjusted time-to-live label resulting from the addition of the value of the time-to-live label read from the packet message and the local time at which the packet was received;
   and in which the means arranged to associate an indication of a period of time with each packet message, associates with at least one packet message, the result of said adjusted time-to-live read from each said packet message minus the local time at which said packet message arrived such that the means arranged to discard each packet message are so arranged to discard a packet message if said associated sum is less than or equal to zero.

8. A packet messaging system according to claim 5 wherein a packet message source includes means arranged to associate a packet message source identity with each packet message and means arranged to associate a packet message payload type setting with each packet message, and said communications link interface further comprising:
   means arranged to read a packet message source identity from each received packet message;
   means arranged to read a packet message payload type setting associated with each received packet message;
   means arranged to test the packet message queue for a queued packet message with an associated source identity matching that of the received packet message;
   means arranged to read the priority label associated with the matching queued packet message;
   means arranged to sort into the queue on the basis of priority label a packet message replacing the matched received and queued packet messages, having the associated source identity of the matched received and queued packet messages, the payload of the received packet message and whichever of the associated priority label of the matched received and queued packet message represents the higher priority.

9. A packet messaging system comprising:
   a plurality of packet message sources each comprising:
   means arranged to include a respective packet message payload in each packet message of a sequence of packet messages; and
   means arranged to send such packet messages; and
   a communications link interface comprising:
   an input port for receiving packet messages from said plurality of packet message sources;
   means arranged to read a priority label associated with each received packet message;
   a queue for queuing packet messages in descending order of respective allocated priority labels; successive packets, considered in said sequence at each one of said plurality of packet message sources, having been allocated said priority labels in accordance with a predetermined cyclic sequence of such labels; said priority labels each representing one of a plurality of priority levels and the positions of the labels in the cyclic sequence being controlled to maximize the number of consecutive labels having a lower priority than a nearest other label in the sequence of equal or higher priority with a label of a given priority occurring only once in each cycle; and an output port for sending each packet message at the head of said queue onto a communications link.

10. A method of packet messaging comprising:

including a respective packet message payload in each packet message of a sequence of packet messages;

associating a priority label with each successive packet message of said sequence in accordance with a predetermined cyclic sequence of such labels; said priority labels each representing one of a plurality of priority levels and the positions of the labels in the cyclic sequence being controlled to maximize the number of consecutive labels having a lower priority than a nearest other label in the sequence of equal or higher priority with a label of a given priority occurring only once in each cycle; and sending such packet messages.

11. A method of operating a packet messaging system including a plurality of packet message sources and a communications link interface, said method comprising:

allocating successive packets, considered in their original sequence at each one of the packet message sources, priority labels in accordance with a predetermined cyclic sequence of such labels; said priority labels each representing one of a plurality of priority levels and the positions of the labels in the cyclic sequence being controlled to maximize the number of consecutive labels having a lower priority than a nearest other label in the sequence of equal or higher priority with a label of a given priority occurring only once in each cycle;

queuing said packet messages in a queue in descending order of respective allocated priority labels at said communications link interface; and sending each packet message at the head of said queue onto a communications link.

12. A computer readable storage medium, said medium embodying computer readable code for reading into a computer and executable by said computer to perform the method of claim 10.

* * * * *